US012233806B2

(12) United States Patent
Nagasawa

(10) Patent No.: US 12,233,806 B2
(45) Date of Patent: Feb. 25, 2025

(54) AIRBAG APPARATUS

(71) Applicant: SUBARU CORPORATION, Tokyo (JP)

(72) Inventor: Isamu Nagasawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 18/375,769

(22) Filed: Oct. 2, 2023

(65) Prior Publication Data

US 2024/0140346 A1  May 2, 2024

(30) Foreign Application Priority Data

Oct. 20, 2022 (JP) .................................. 2022-168646

(51) Int. Cl.
*B60R 21/207* (2006.01)
*B60R 21/231* (2011.01)
*B60R 21/233* (2006.01)
*B60R 21/2346* (2011.01)
*B60R 21/264* (2006.01)

(52) U.S. Cl.
CPC ...... *B60R 21/207* (2013.01); *B60R 21/23138* (2013.01); *B60R 21/233* (2013.01); *B60R 21/2346* (2013.01); *B60R 21/264* (2013.01); *B60R 2021/23146* (2013.01)

(58) Field of Classification Search
CPC ............ B60R 21/207; B60R 21/23138; B60R 2021/23146; B60R 21/233; B60R 21/231; B60R 21/2346; B60R 21/264
See application file for complete search history.

(56) References Cited

U.S. PATENT DOCUMENTS 3,731,949 A * 5/1973 Radke .................. B60R 21/232
  182/138
4,359,200 A * 11/1982 Brevard ................. B64D 25/02
  244/122 AG (Continued)

FOREIGN PATENT DOCUMENTS

EP        3838689 A1    6/2021
WO  WO 2020/036048 A1  6/2021

*Primary Examiner* — Timothy Wilhelm
(74) *Attorney, Agent, or Firm* — MCGINN I.P. LAW GROUP, PLLC

(57) ABSTRACT

An airbag apparatus includes a far-side airbag and an expansion control processor controlling expansion of the far-side airbag. The far-side airbag is a cylindrical base fabric member, has an annular outer periphery, and has a shoulder protection air chamber, a head protection air chamber, and a non-inflating unit in an inner periphery. The shoulder protection air chamber is expanded into a longitudinal cylindrical shape to protect a shoulder of an occupant seated in a vehicle front seat. The head protection air chamber is expanded into a semicircular shape and falls against the occupant to protect the occupant's head. The non-inflating unit is disposed adjacent to the back shoulder air chamber and includes an inflator covered with a cylinder. The far-side airbag has a gas passage through which high-pressure gas discharged from discharge ports of the cylinder are fed to the shoulder protection air chamber and the head protection air chamber.

7 Claims, 5 Drawing Sheets

(56) References Cited

U.S. PATENT DOCUMENTS

| | | | | |
|---|---|---|---|---|
| 4,946,191 A * | 8/1990 | Putsch | B60N 2/80 | 280/730.2 |
| 5,570,900 A * | 11/1996 | Brown | B60R 21/23138 | 280/739 |
| 6,142,517 A * | 11/2000 | Nakamura | B60R 21/23138 | 280/739 |
| 6,988,578 B2 * | 1/2006 | Kikuchi | B60R 21/36 | 296/193.11 |
| 7,188,862 B2 * | 3/2007 | Webber | B60R 21/26 | 280/743.2 |
| 7,198,286 B2 * | 4/2007 | Kai | B60R 21/203 | 280/743.1 |
| 7,316,415 B2 * | 1/2008 | Jamison | B60R 21/233 | 280/730.2 |
| 7,611,164 B2 * | 11/2009 | Kai | B60R 21/233 | 280/730.2 |
| 7,614,648 B2 * | 11/2009 | Heudorfer | B60R 21/235 | 280/730.2 |
| 7,661,702 B2 * | 2/2010 | Ochiai | B60R 21/232 | 280/730.2 |
| 7,735,858 B2 * | 6/2010 | Megiveron | B60R 21/0136 | 280/730.2 |
| 7,819,419 B2 * | 10/2010 | Hayashi | B60R 21/233 | 280/730.2 |
| 7,862,077 B2 * | 1/2011 | Yokota | B60R 21/23138 | 280/730.2 |
| 7,918,482 B2 * | 4/2011 | Sugimoto | B60R 21/233 | 280/730.2 |
| 7,922,190 B2 * | 4/2011 | Sugimoto | B60R 21/233 | 280/736 |
| 7,942,440 B2 * | 5/2011 | Choi | B60R 21/2346 | 280/740 |
| 8,087,692 B2 * | 1/2012 | Klaiber | B60R 21/239 | 280/739 |
| 8,136,837 B2 * | 3/2012 | Feller | B60R 21/237 | 280/743.1 |
| 8,297,649 B2 * | 10/2012 | Enders | B60R 21/231 | 280/743.2 |
| 8,297,651 B2 * | 10/2012 | Kwon | B60R 21/0136 | 180/274 |
| 8,328,228 B2 * | 12/2012 | Lee | B60R 21/214 | 280/743.1 |
| 8,360,466 B2 * | 1/2013 | Kino | B60R 21/237 | 280/730.2 |
| 8,360,469 B2 * | 1/2013 | Wiik | B60R 21/23138 | 280/730.2 |
| 8,388,019 B2 * | 3/2013 | Wipasuramonton | B60R 21/2342 | 280/730.2 |
| 8,414,017 B2 * | 4/2013 | Lee | B60R 21/231 | 280/743.1 |
| 8,448,981 B2 * | 5/2013 | Fukawatase | B60R 21/23138 | 280/730.2 |
| 8,474,863 B2 * | 7/2013 | Rick | B60R 21/23138 | 280/730.2 |
| 8,684,408 B2 * | 4/2014 | Thomas | B60R 21/2338 | 280/730.2 |
| 8,764,057 B1 * | 7/2014 | Jamison | B60R 21/239 | 280/743.1 |
| 8,840,135 B2 * | 9/2014 | Jenny | B60R 21/20 | 280/730.2 |
| 9,039,037 B2 * | 5/2015 | Fukushima | B60R 21/2346 | 280/730.2 |
| 9,340,175 B2 * | 5/2016 | Yuki | D05B 1/26 | |
| 9,376,040 B2 * | 6/2016 | Fukawatase | B60R 21/207 | |
| 9,428,135 B1 * | 8/2016 | Thomas | B60R 21/2338 | |
| 9,592,788 B2 * | 3/2017 | Wiik | B60R 21/233 | |
| 9,663,061 B2 * | 5/2017 | Mihm | B60R 21/23138 | |
| 9,707,922 B2 * | 7/2017 | Wiik | B60R 21/23138 | |
| 9,751,491 B2 * | 9/2017 | Sugimura | B60R 21/233 | |
| 9,783,149 B2 * | 10/2017 | Taguchi | B60R 21/239 | |
| 9,821,749 B2 * | 11/2017 | Hotta | B60R 21/233 | |
| 9,873,399 B2 * | 1/2018 | Goto | B60R 21/235 | |
| 9,925,949 B2 * | 3/2018 | Mihm | B60R 21/231 | |
| 9,932,011 B2 * | 4/2018 | Hiraiwa | B60R 21/207 | |
| 9,944,246 B2 * | 4/2018 | Ohno | B60R 21/23138 | |
| 9,969,348 B2 * | 5/2018 | Fujiwara | B60R 21/237 | |
| 9,975,519 B2 * | 5/2018 | Kobayashi | B60R 21/237 | |
| 10,035,485 B2 * | 7/2018 | Fujiwara | B60R 21/207 | |
| 10,272,866 B2 * | 4/2019 | Hiraiwa | B60N 2/42745 | |
| 10,300,878 B2 * | 5/2019 | Park | B60R 21/207 | |
| 10,351,091 B2 * | 7/2019 | Abe | B60R 21/2334 | |
| 10,407,017 B2 * | 9/2019 | Markusic | B60R 21/26 | |
| 10,513,239 B2 * | 12/2019 | Weyrich | B60R 21/23138 | |
| 10,583,799 B2 * | 3/2020 | Schneider | B60R 21/2338 | |
| 10,682,976 B2 * | 6/2020 | Rathgeb | B60R 21/23138 | |
| 10,703,321 B2 * | 7/2020 | Deng | B60R 21/23138 | |
| 10,829,080 B2 * | 11/2020 | Taguchi | B60R 21/239 | |
| 10,857,965 B2 * | 12/2020 | Abe | B60R 21/214 | |
| 10,960,845 B2 * | 3/2021 | Schwarzwald | B60R 21/239 | |
| 11,124,146 B2 * | 9/2021 | Saso | B60R 21/232 | |
| 11,377,062 B2 * | 7/2022 | Kwon | B60R 21/2338 | |
| 11,383,669 B2 * | 7/2022 | Schneider | B60R 21/2338 | |
| 11,458,925 B2 * | 10/2022 | Heudis | B60R 21/233 | |
| 11,505,155 B1 * | 11/2022 | Faruque | B60R 21/2338 | |
| 11,608,023 B2 * | 3/2023 | Ikeda | B60R 21/207 | |
| 11,691,588 B2 * | 7/2023 | Fukawatase | B60R 21/18 | 280/728.2 |
| 11,708,044 B2 * | 7/2023 | Dinsdale | B60R 21/2346 | 280/743.1 |
| 11,718,260 B2 * | 8/2023 | Ohachi | B60N 2/885 | 280/730.1 |
| 11,731,576 B2 * | 8/2023 | Fuma | B60R 21/207 | 280/729 |
| 11,827,171 B2 * | 11/2023 | Kawamura | B60R 21/207 | |
| 11,827,173 B2 * | 11/2023 | Freisler | B60R 21/207 | |
| 11,912,225 B2 * | 2/2024 | Azuma | B60R 21/23138 | |
| 11,919,469 B2 * | 3/2024 | Bogdanovic | B60R 21/23138 | |
| 2004/0124615 A1 * | 7/2004 | Tanase | B60R 21/23138 | 280/730.2 |
| 2005/0110248 A1 * | 5/2005 | Kai | B60R 21/203 | 280/729 |
| 2005/0189742 A1 * | 9/2005 | Kumagai | B60R 21/261 | 280/730.2 |
| 2005/0206143 A1 * | 9/2005 | Webber | B60R 21/2338 | 280/736 |
| 2006/0022441 A1 * | 2/2006 | Hayashi | B60R 21/207 | 280/730.2 |
| 2006/0131847 A1 * | 6/2006 | Sato | B60R 21/23138 | 280/730.2 |
| 2006/0163848 A1 * | 7/2006 | Abe | B60R 21/231 | 280/729 |
| 2007/0164546 A1 * | 7/2007 | Kai | B60R 21/2346 | 280/730.2 |
| 2007/0267853 A1 * | 11/2007 | Kato | B60R 21/207 | 280/730.2 |
| 2009/0230659 A1 * | 9/2009 | Megiveron | B60R 21/0136 | 280/730.2 |
| 2010/0140909 A1 * | 6/2010 | Jang | B60R 21/2338 | 280/743.1 |
| 2010/0295277 A1 * | 11/2010 | Ochiai | B60R 21/23138 | 280/729 |
| 2013/0079208 A1 * | 3/2013 | Wiik | B60R 21/23138 | 493/405 |
| 2014/0284906 A1 * | 9/2014 | Akiyama | B60R 21/233 | 280/730.2 |
| 2015/0314748 A1 * | 11/2015 | Mihm | B60R 21/23138 | 280/730.2 |
| 2016/0107604 A1 * | 4/2016 | Fujiwara | B60R 21/23138 | 280/729 |
| 2016/0167616 A1 * | 6/2016 | Wiik | B60R 21/23138 | 280/729 |
| 2017/0174174 A1 * | 6/2017 | Ohno | B60R 21/23138 | |
| 2017/0274862 A1 * | 9/2017 | Mihm | B60R 21/231 | |
| 2018/0154858 A1 * | 6/2018 | Aranzulla | B60R 21/231 | |
| 2018/0354449 A1 * | 12/2018 | Markusic | B60R 21/23138 | |
| 2019/0016291 A1 * | 1/2019 | Paxton | B60R 21/2338 | |
| 2019/0054890 A1 * | 2/2019 | Kwon | B60R 21/2338 | |
| 2019/0077356 A1 * | 3/2019 | Patel | B60R 21/207 | |

(56) References Cited

U.S. PATENT DOCUMENTS

| | | | |
|---|---|---|---|
| 2019/0143930 A1* | 5/2019 | Hioda | B60R 21/207 |
| | | | 280/730.2 |
| 2019/0283700 A1* | 9/2019 | Kwon | B60R 21/2338 |
| 2020/0238941 A1* | 7/2020 | Saso | B60R 21/214 |
| 2021/0122318 A1* | 4/2021 | Yoo | B60R 21/23138 |
| 2022/0332274 A1* | 10/2022 | Dinsdale | B60R 21/231 |
| 2023/0202419 A1* | 6/2023 | Ito | B60R 21/23138 |
| | | | 280/728.2 |
| 2023/0303028 A1* | 9/2023 | Ohno | B60R 21/2338 |

* cited by examiner

AIRBAG APPARATUS

CROSS-REFERENCE TO RELATED APPLICATIONS

The present application claims priority from Japanese Patent Application No. 2022-168646 filed on Oct. 20, 2022, the entire contents of which are hereby incorporated by reference.

BACKGROUND

The disclosure relates to an airbag apparatus.

Airbag apparatuses have been put in practical use and widely used as safety apparatuses that protect occupants in vehicles upon contact of the vehicles.

As one of these airbag apparatuses, a far-side airbag apparatus has been also put in practical use. The far-side airbag apparatus protects an occupant by restricting an occupant's behavior caused upon side contact of an own vehicle.

International Publication No. WO 2020/036048, for example, discloses an airbag device that includes first to third expanding portions and a recessed part. The first expanding portion expands and deploys on a side of a shoulder of an occupant. The second and third expanding portions expand and deploy further forward and rearward than the first expanding portion. The recessed part is formed between the second and third expanding portions. A tether is attached to the second expanding portion and a seat frame so as to bridge the recessed part, and opposes the first expanding portion via the recessed part. Upon deployment of the airbag, the tether comes into contact with the shoulder of the occupant, and therefore, the second expanding portion changes its shape in a direction closer to a front of the occupant.

SUMMARY

An aspect of the disclosure provides an airbag apparatus to be applied to a vehicle. The airbag apparatus includes a far-side airbag and an expansion control processor. The far-side airbag is to be disposed on a center console side of a seat backrest of a front seat of the vehicle. The far-side airbag is a single cylindrical base fabric member. The far-side airbag has an annular outer periphery, and has a shoulder protection air chamber, a head protection air chamber, and a non-inflating unit in an inner periphery. The shoulder protection air chamber has a back shoulder air chamber, a side shoulder air chamber, and a front shoulder air chamber that are each to be expanded into a longitudinal cylindrical shape to protect a shoulder of an occupant in the vehicle. The head protection air chamber is to be expanded into a semicircular shape and fall against the occupant seated in the front seat of the vehicle to protect a head portion of the occupant. The non-inflating unit is disposed adjacent to the back shoulder air chamber. The expansion control processor is configured to control expansion of the far-side airbag. The non-inflating unit includes an inflator therein. The inflator is covered with a cylinder. The far-side airbag has a gas passage through which high-pressure gas discharged from discharge ports of the cylinder are to be fed into the shoulder protection air chamber and the head protection air chamber.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
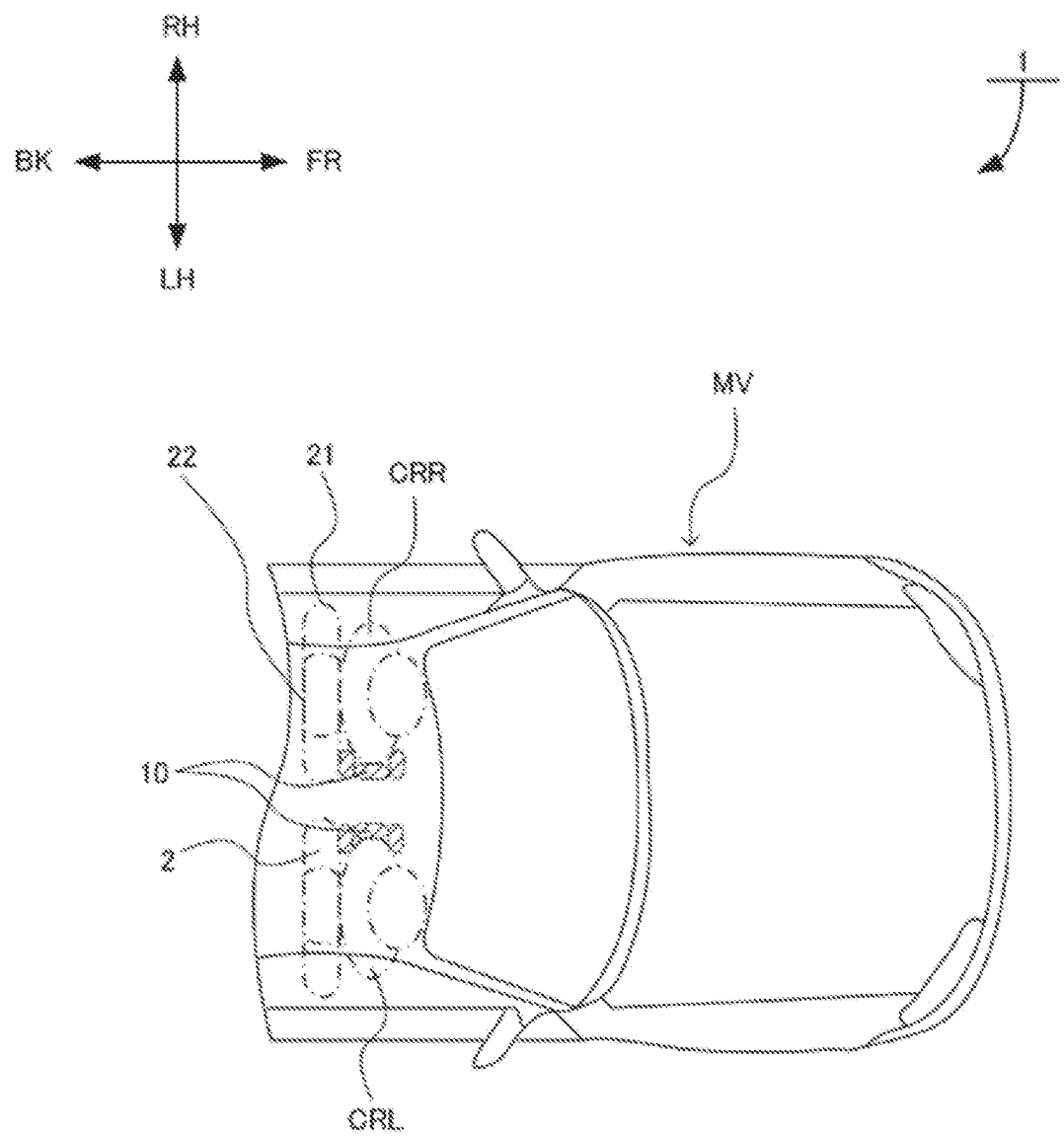
FIG. 1 is a plan view of a vehicle on which an airbag apparatus according to one example embodiment of the disclosure is mounted.

An airbag device disclosed in International Publication No. WO 2020/036048 restricts an occupant's behavior by holding a shoulder of an occupant by a reaction force of a tether.

However, when another occupant is seated in a passenger seat, the occupant seated in the passenger seat exhibits a behavior different from that of the occupant seated in the driver seat due to a difference in contact shock transmission. This can result in contact between the occupant in the driver seat and the occupant in the passenger seat.

In addition, the airbag device disclosed in International Publication No. WO 2020/036048, which restricts the occupant's behavior by holding the shoulder of the occupant upon side contact of the vehicle, is not expected to provide a sufficient effect to control the occupant's behavior upon frontal contact of the vehicle.

It is desirable to provide an airbag apparatus that appropriately controls an occupant's behavior upon any of side contact and frontal contact of a vehicle.

Example Embodiment

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings. As used herein, the term "collision" may be used interchangeably with the term "contact".

An airbag apparatus 1 according to an example embodiment of the disclosure will now be described with reference to FIGS. 1 to 5.

Figure 2:
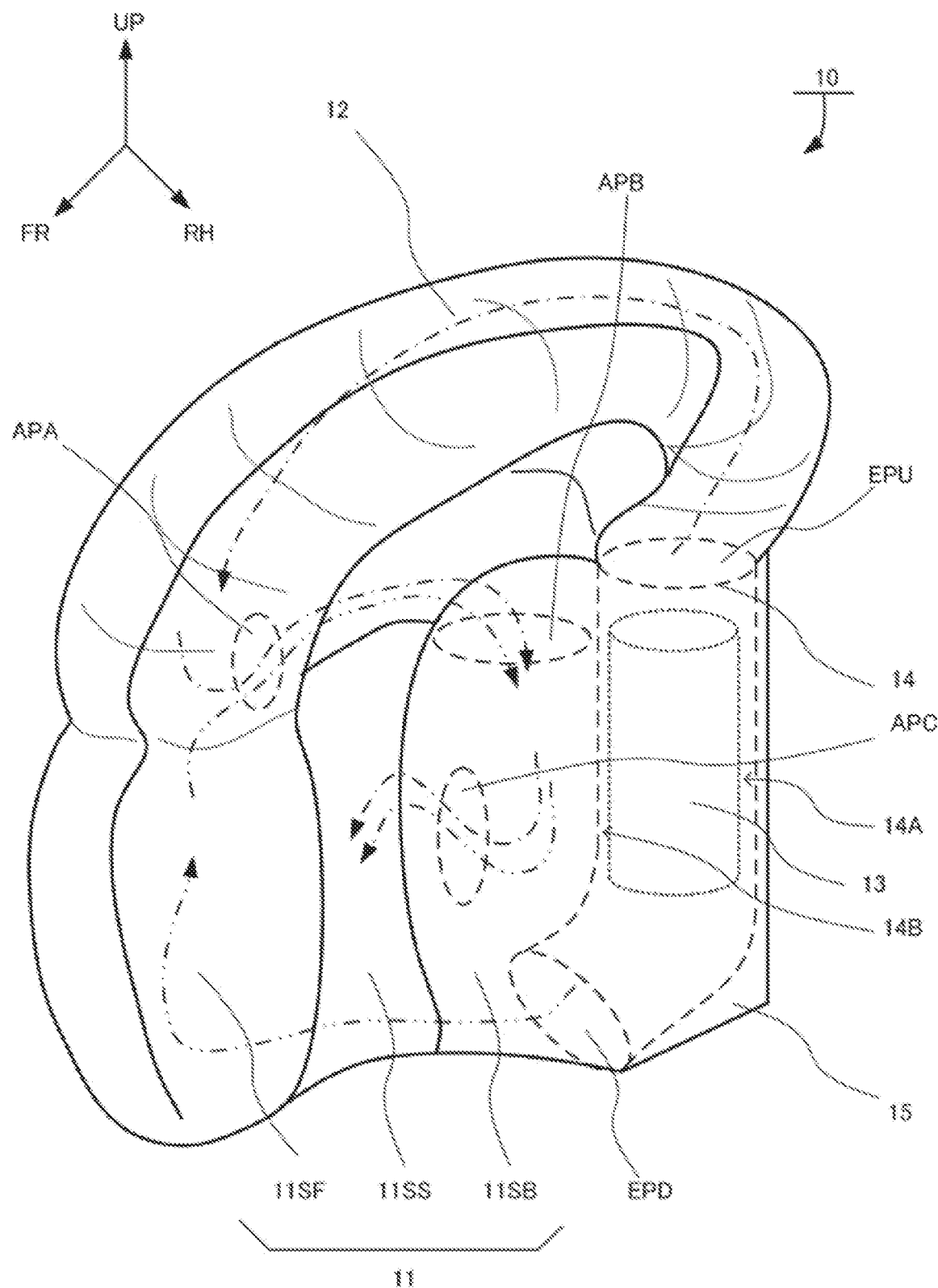
FIG. 2 is an enlarged perspective view of the airbag apparatus according to one example embodiment of the disclosure.
Figure 5:
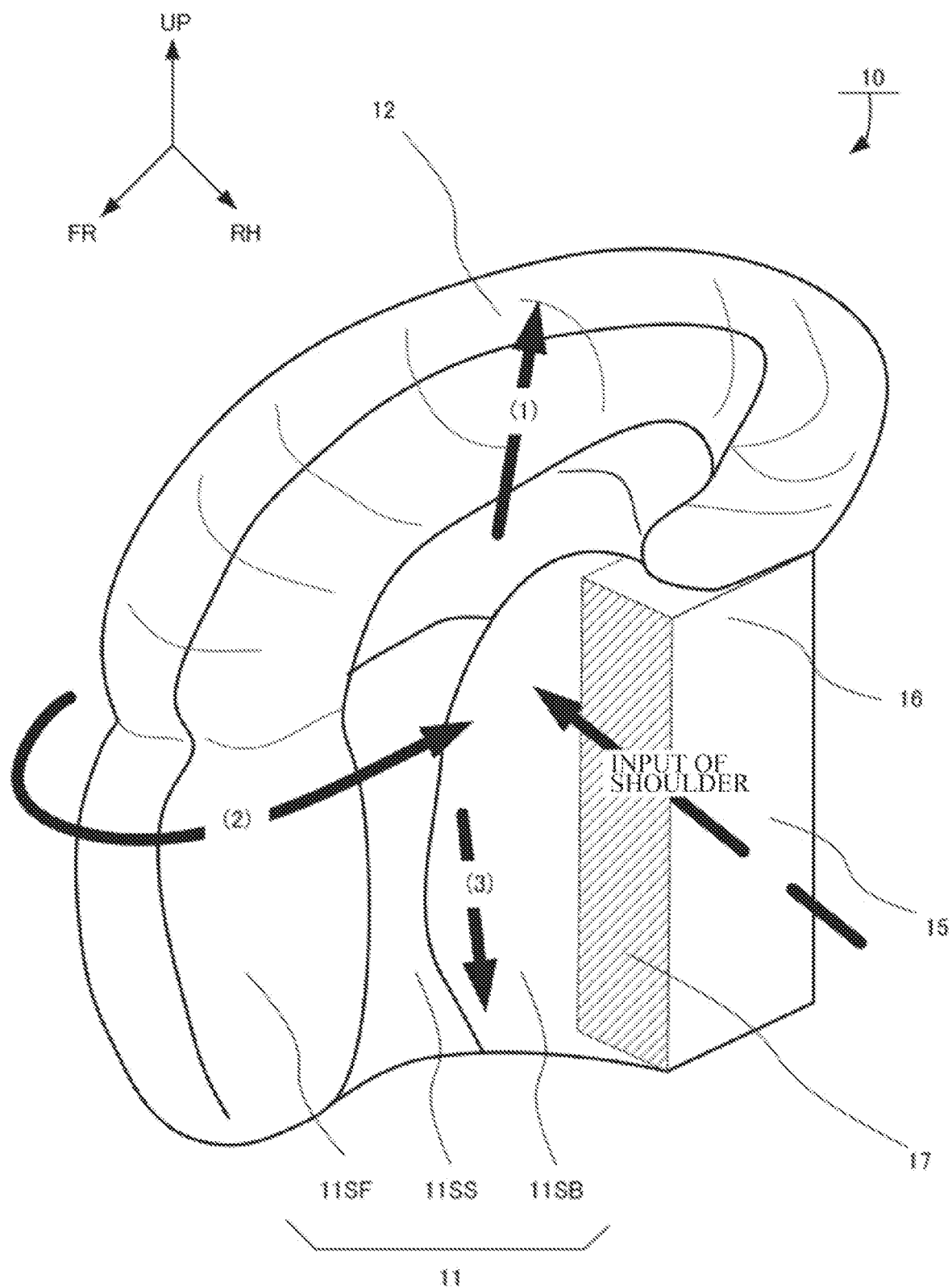
FIG. 5 is a diagram illustrating an expanded state of the airbag apparatus according to one example embodiment of the disclosure.

In FIGS. 1, 2, and 5, an arrow FR indicates a frontward direction of a vehicle, an arrow BK indicates a backward direction of the vehicle, an arrow UP indicates an upward direction of the vehicle, an arrow DN indicates a downward direction of the vehicle, an arrow LH indicates a left-side of a vehicle width direction in front view of the vehicle, and an arrow RH indicates a right-side of the vehicle width direction in front view of the vehicle.

Note that upward, downward, frontward, backward, rightward, and leftward directions used in the following description are directions with respect to the vehicle in front view of the vehicle unless otherwise stated.

FIG. 1 illustrates an own vehicle MV on which the airbag apparatus 1 according to the example embodiment is mounted.

In FIG. 1, occupants CRR and CRL and far-side airbags 10 of the airbag apparatus 1 are illustrated. The occupants CRR and CRL are seated in respective seats 2 each including a seat backrest 21 and a head rest 22. Hereinafter, the occupants CRR and CRL may be each referred to as an "occupant CR" when they are not to be distinguished from each other. The far-side airbag 10 is disposed on a center console side of the seat backrest 21. The far-side airbags 10 may be expanded upon the occurrence of contact at a left-side face or a right-side face of the own vehicle MV in the vehicle width direction, or the occurrence of frontal contact of the own vehicle MV <Exemplary Configuration of Far-Side Airbag 10>

As illustrated in FIGS. 2 and 5, the far-side airbag 10 according to the example embodiment is a single cylindrical base fabric member.

The far-side airbag 10, which is the single cylindrical base fabric member, may be stitched with a tether to have an annular outer periphery and to have a shoulder protection air chamber 11, a head protection air chamber 12, and a non-inflating unit 15 in an inner periphery. The shoulder protection air chamber 11 has a back shoulder air chamber 11SB, a side shoulder air chamber 11SS, and a front shoulder air chamber 11SF that are each expanded into a longitudinal cylindrical shape to protect a shoulder of the occupant CR. The head protection air chamber 12 is expanded into a semicircular shape and falls against the occupant CR seated in the seat 2 to protect the head of the occupant CR. The non-inflating unit 15 is disposed adjacent to the back shoulder air chamber 11SB.

In the non-inflating unit 15, a storage case 16 may be provided. In the storage case 16, an inflator 13 covered with a cylinder 14 may be stored. The cylinder 14 has discharge ports EPU and EPD at an upper end and a lower end, respectively.

The far-side airbag 10 has a gas passage having apertures APA, APB, and APC formed by a tether. High-pressure gas discharged from the discharge ports EPU and EPD are fed into the shoulder protection air chamber 11 and the head protection air chamber 12 through the gas passage.

In FIG. 2, dashed-dotted curved arrows indicate the flow of the high-pressure gas discharged from the discharge port EPU, and dashed-two dotted curved arrows indicate the flow of the high-pressure gas discharged from the discharge port EPD.

The head protection air chamber 12, the back shoulder air chamber 11SB, the side shoulder air chamber 11SS, and the front shoulder air chamber 11SF of the far-side airbag 10 may be inflated and expanded in this order by the high-pressure gas discharged from the discharge ports EPU and EPD.

The cylinder 14 may have a J-shape extending from its upper portion to its lower portion. The cylinder 14 may have the discharge port EPU at the upper end and the discharge port EPD at the lower end.

Inside the cylinder 14, hollow spaces 14A and 14B may be defined between an inner face of the cylinder 14 and an outer shape of the inflator 3.

After the expansion of the far-side airbag 10, the hollow spaces 14A and 14B of the cylinder 14 may equalize the pressure of the high-pressure gas. When a back face of the shoulder of the occupant CR comes into contact with the back shoulder air chamber 11SB, the front shoulder air chamber 11SF may change its expanded shape so as to wrap around the shoulder of the occupant CR.

<Electrical Configuration of Airbag Apparatus 1>

An exemplary electrical configuration of the airbag apparatus 1 according to the example embodiment will now be described with reference to FIG. 3.

Figure 3:
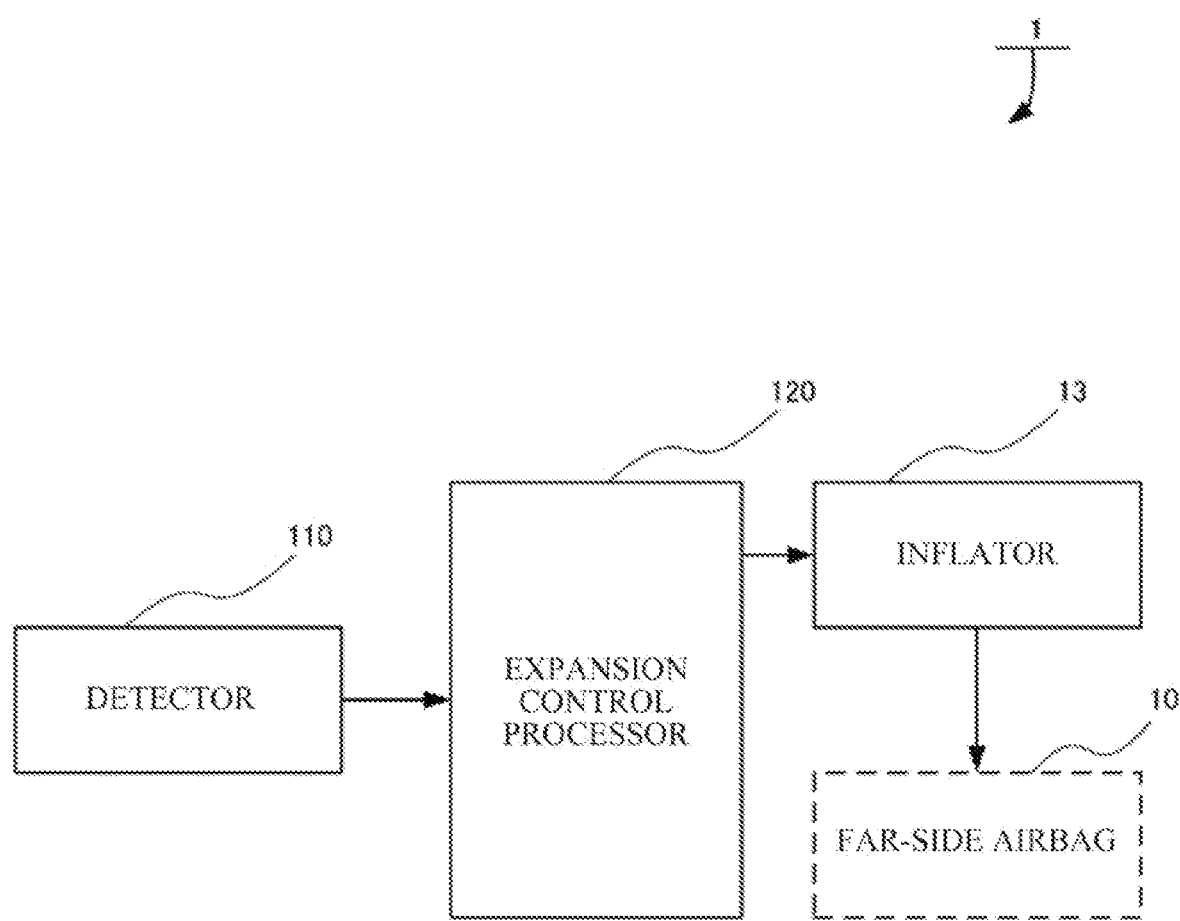
FIG. 3 is a block diagram illustrating an exemplary configuration of the airbag apparatus according to one example embodiment of the disclosure.

As illustrated in FIG. 3, the airbag apparatus 1 according to the example embodiment may include a detector 110, an expansion control processor 120, and an inflator 13.

The detector 110 may detect a direction of contact of the own vehicle MV.

The detector 110 may be, for example, a sensor that includes a sensor unit that detects right-side contact, a sensor unit that detects left-side contact, and and a sensor unit that detects frontal contact.

The detector 110 may output sensor data acquired by these sensor units to the expansion control processor 120.

The detector 110 may be an acceleration sensor that detects a shock or vibration applied to the own vehicle MV as an acceleration rate, for example.

Examples of the acceleration sensor may include a piezoresistive acceleration sensor that utilizes a change in electric resistance of a semiconductor, and an electrostatic capacitance acceleration sensor that detects a gap change between a movable part and a fixing part of an interdigital electrode as an electrostatic capacitance.

Alternatively, the detector 110 may include an acceleration sensor that detects contact and another acceleration sensor that detects a floor acceleration rate. In this case, the detector 110 may determine or assess contact of the own vehicle MV based on the acceleration rates measured by both of the acceleration sensors.

The expansion control processor 120 controls the expansion of the far-side airbag 10.

For example, the expansion control processor 120 may control the activation of the inflator 13 (to be described later) based on the sensor data received from the detector 110.

In the example embodiment, the expansion control processor 120 may control the activation of the inflator 13 (to be described later) when receiving any one of the sensor data indicating detection of right-side contact, the sensor data indicating detection of left-side contact, and the sensor data indicating detection of frontal contact from the detector 110.

When receiving an activation signal from the expansion control processor 120, the inflator 13 may supply high-pressure gas to the far-side airbag 10 to inflate and expand the far-side airbag 10.

The inflator 13 may discharge the high-pressure gas from longitudinal ends of the body of the inflator 13 to the outside.

<Processing by Airbag Apparatus 1>

An exemplary flow of the process performed by the airbag apparatus 1 according to the example embodiment will now be described with reference to FIGS. 4 and 5.

Figure 4:
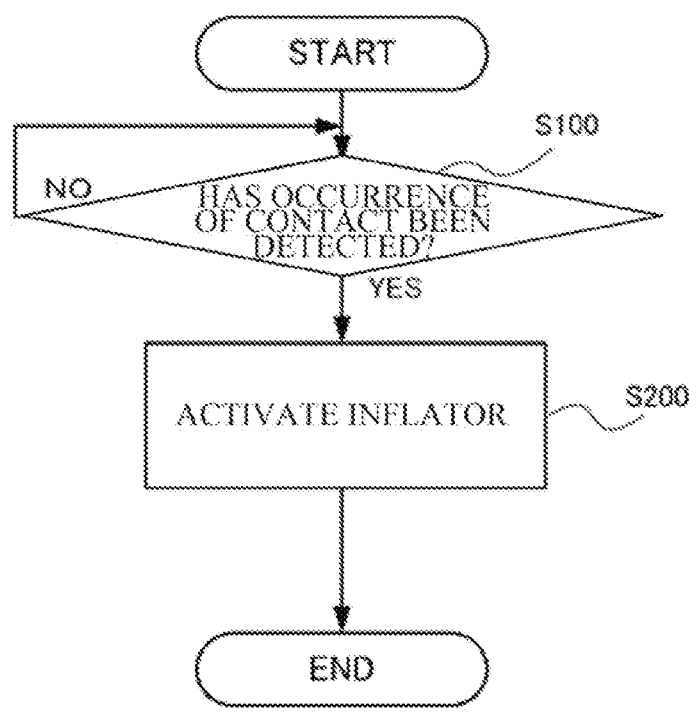
FIG. 4 is a flowchart of a process performed by the airbag apparatus according to one example embodiment of the disclosure.

As illustrated in FIG. 4, the expansion control processor 120 may determine whether the occurrence of contact of the own vehicle MV has been detected based on a detection signal (sensor signal) received from the detector 110 (Step S100).

When the expansion control processor 120 determines that the occurrence of contact of the own vehicle MV has not been detected (Step S100: NO), the flow may return to a stand-by mode.

In contrast, when the expansion control processor 120 determines that the occurrence of contact of the own vehicle MV has been detected (Step S100: YES), the inflator 13 may be activated (Step S200), following which the flow may end.

When the inflator 13 is activated in response to the activation signal received from the expansion control processor 120, the high-pressure gas may be discharged from the longitudinal ends of the body of the inflator 13 to the outside.

The inflator 13 may be included in the cylinder 14. The cylinder 14 may have a J-shape extending from its upper portion to its lower portion, and the discharge port EPU at the upper end and the discharge port EPD at the lower end. The discharge port EPU may open in a direction toward the head protection air chamber 12 provided above the discharge port EPU, and the discharge port EPD may open in a direction in which an end of the cylinder 14 curves along a surface of the shoulder protection air chamber 11.

When the inflator 13 is activated, the high-pressure gas may flow from an upper portion of the far-side airbag 10 (as indicated by an arrow (1) in FIG. 5) in an outer peripheral direction of the far-side airbag 10 to expand the back shoulder air chamber 11SB. Thereafter, the high-pressure gas may flow into a frontal inner side of the outer periphery of the far-side airbag 10 (as indicated by an arrow (2) in FIG. 5), and may change its direction to a lower inner side of the outer periphery of the far-side airbag 10 (as indicated by an arrow (3) in FIG. 5) to expand the side shoulder air chamber 11SS and the front shoulder air chamber 11SF.

In more detail, as illustrated in FIG. 2, the high-pressure gas discharged from the upper end of the inflator 13 (indicated by the dashed-dotted arrow) may flow through the discharge port EPU at the upper end of the cylinder 14 into an upper outer peripheral direction of the far-side airbag 10.

In contrast, the high-pressure gas discharged from the lower end of the inflator 13 (indicated by the dashed-two dotted arrow in FIG. 2) may flow through the discharge port EPD at the lower end of the cylinder 14 via a bottom portion of the shoulder protection air chamber 11 into the front shoulder air chamber 11SF, and may change its direction to the upward direction.

The high-pressure gas discharged from the upper end of the inflator 13 (indicated by the dashed-dotted arrow in FIG. 2) and the high-pressure gas discharged from the lower end of the inflator 13 (indicated by the dashed-two dotted arrow in FIG. 2) may merge with each other at the aperture APA provided between the head protection air chamber 12 and the shoulder protection air chamber 11, and may flow through the aperture APB into the back shoulder air chamber 11SB to expand the back shoulder air chamber 11SB.

Thereafter, the merged high-pressure gas may flow into the side shoulder air chamber 11SS through the aperture APC to expand the side shoulder air chamber 11S S.

Thereafter, the front shoulder air chamber 11SF and the head protection air chamber 12 may be expanded, which may complete the expansion of the entire far-side airbag 10.

Further, when the shoulder of the occupant CR is pressed against the back shoulder air chamber 11SB upon the occurrence of contact of the own vehicle MV as illustrated in FIG. 5, the shoulder protection air chamber 11 may rotate forward around a side face 17 of the storage case 16 of the inflator 13 to deform so as to wrap around the entire shoulder of the occupant CR.

Workings and Effects

The airbag apparatus 1 according to the foregoing example embodiment described above includes the far-side airbag 10 and the expansion control processor 120. The far-side airbag 10 is disposed on the center console side of the seat backrest 21 of the front seat of the own vehicle MV. The far-side airbag 10 is the single cylindrical base fabric member. The far-side airbag 10 has the annular outer periphery, and has the shoulder protection air chamber 11, the head protection air chamber 12, and the non-inflating unit 15 on the inner periphery. The shoulder protection air chamber 11 has the back shoulder air chamber 11SB, the side shoulder air chamber 11SS, and the front shoulder air chamber 11SF. The back shoulder air chamber 11SB, the side shoulder air chamber 11S S, and the front shoulder air chamber 11SF are each expanded into a longitudinal cylindrical shape to protect the shoulder of the occupant CR to protect a shoulder of the occupant in the own vehicle MV. The head protection air chamber 12 is expanded into a semicircular shape and falls against the occupant CR seated in the seat 2 of the own vehicle MV to protect a head portion of the occupant CR. The non-inflating unit 15 is disposed adjacent to the back shoulder air chamber 11SB. The expansion control processor 120 controls the expansion of the far-side airbag 10. The non-inflating unit 15 includes the inflator 13 therein, and the inflator 13 is covered with the cylinder 14. The far-side airbag 10 has a gas passage through which the high-pressure gas discharged from the discharge ports EPU and EPD of the cylinder 14 are fed into the shoulder protection air chamber 11 and the head protection air chamber 12.

That is, the far-side airbag 10, which is the single cylindrical base fabric member, may be stitched with the tether to have the shoulder protection air chamber 11, the head protection air chamber 12, and the non-inflating unit 15. The shoulder protection air chamber 11 has the back shoulder air chamber 11SB, the side shoulder air chamber 11SS, and the front shoulder air chamber 11SF each of which is expanded into a longitudinal cylindrical shape. The head protection air chamber 12 is expanded into a semicircular shape and falls against the occupant CR seated in the seat 2 to protect the head of the occupant CR. The non-inflating unit 15 is disposed adjacent to the back shoulder air chamber 11SB.

Accordingly, it is possible to maintain a high degree of sealing of the high-pressure gas discharged from the inflator 13 and remaining inside the far-side airbag 10.

Further, the far-side airbag 10 has the shoulder protection air chamber 11 and the head protection air chamber 12. The shoulder protection air chamber 11 has the back shoulder air chamber 11SB, the side shoulder air chamber 11SS, and the front shoulder air chamber 11SF each of which is expanded into a longitudinal cylindrical shape. The head protection air chamber 12 is expanded into a semicircular shape, and falls against the occupant CR seated in the seat 2 to protect the head of the occupant CR.

Accordingly, it is possible to appropriately protect the shoulder and the head of the occupant CR from the impact of right-side contact, left-side contact, or frontal contact of the own vehicle MV.

Further, the non-inflating unit 15 of the far-side airbag 10 includes the inflator 13 therein, and the inflator 13 is covered with the cylinder 14. The far-side airbag 10 has the gas passage through which the high-pressure gas discharged from the discharge ports EPU and EPD of the cylinder 14 are fed to the shoulder protection air chamber 11 and the head protection air chamber 12.

That is, the non-inflating unit 15 is fixed inside the seat backrest 21, and the high-pressure gas discharged from the ends of the inflator 13 are fed into inside the far-side airbag 10 via the discharge ports EPU and EPD, and are then flown into the shoulder protection air chamber 11 and the head protection air chamber 12 through the gas passage preliminarily formed.

The gas passage preliminarily formed makes it possible to expand the back shoulder air chamber 11SB, the side shoulder air chamber 11SS, and the front shoulder air chamber 11SF of the shoulder protection air chamber 11 and the head protection air chamber 12 immediately at an appropriate timing upon right-side contact, left-side contact, or frontal contact of the vehicle.

Further, according to the airbag apparatus 1 of the foregoing example embodiment, the back shoulder air chamber 11SB and the side shoulder air chamber 11SS that are provided on an inner side of the outer periphery of the far-side airbag 10 may be inflated and expanded in this order by the high-pressure gas discharged from the discharge ports EPU and EPD of the cylinder 14, following which the front shoulder air chamber 11SF and the head protection air chamber 12 may be inflated and expanded by the high-pressure gas.

That is, upon the occurrence of side contact of the vehicle, the shoulder of the occupant CR may be pressed against the back shoulder air chamber 11SB first, and then against the side shoulder air chamber 11SS. In addition, the head of the occupant CR may incline toward the head protection air chamber 12.

Upon the occurrence of frontal contact of the vehicle, the shoulder of the occupant CR may be pressed against the back shoulder air chamber 11SB first, and then against the front shoulder air chamber 11SF.

Following the expanding order of the airbag apparatus 1 according to the foregoing example embodiment, it is possible to appropriately control the occupant behavior upon the occurrence of any of side contact and frontal contact of the vehicle.

Further, according to the airbag apparatus 1 of the foregoing example embodiment, the cylinder 14 may have a J-shape.

For example, the cylinder 14 may have a J-shape extending from its upper portion to its lower portion, and may be provided with the discharge ports EPU and EPD at its upper end and its lower end, respectively.

That is, the high-pressure gas discharged from the ends of the inflator 13 may be fed into inside the far-side airbag 10 along the shape of the cylinder 14 through the discharge ports EPU and EPD.

The shape of the cylinder 14 and the gas passage preliminarily formed make it possible to expand the back shoulder air chamber 11SB, the side shoulder air chamber 11SS, and the front shoulder air chamber 11SF of the shoulder protection air chamber 11 and the head protection air chamber 12 immediately at an appropriate timing upon right-side contact, left-side contact, or frontal contact of the own vehicle MV.

Further, according to the airbag apparatus 1 of the foregoing example embodiment, the far-side airbag 10 may be provided with the hollow spaces 14A and 14B defined between the inner face of the cylinder 14 and the outer shape of the inflator 13. When the shoulder of the occupant CR comes into contact with the back shoulder air chamber 11SB after the expansion of the far-side airbag 10, the shoulder protection air chamber 11 may change its expanded shape so as to wrap around the shoulder of the occupant CR.

That is, when the back face of the shoulder of the occupant CR comes into contact with the back shoulder air chamber 11SB after the expansion of the far-side airbag 10, the hollow spaces 14A and 14B defined between the inner face of the cylinder 14 and the outer shape of the inflator 13 may equalize the high-pressure gas. Accordingly, the shoulder protection air chamber 11 may be rotated forward by the pressing force applied to the back shoulder air chamber 11SB so as to wrap around the entire shoulder of the occupant CR.

It is possible to implement the airbag apparatus 1 of the foregoing example embodiment of the disclosure by recording the process to be executed by the expansion control processor 120 on a non-transitory recording medium readable by a computer system, and causing the computer system to load the program recorded on the non-transitory recording medium onto the expansion control processor 120 to execute the program. The computer system as used herein may encompass an operating system (OS) and a hardware such as a peripheral device.

In addition, when the computer system utilizes a World Wide Web (WWW) system, the "computer system" may encompass a website providing environment (or a website displaying environment). The program may be transmitted from a computer system that contains the program in a storage device or the like to another computer system via a transmission medium or by a carrier wave in a transmission medium. The "transmission medium" that transmits the program may refer to a medium having a capability to transmit data, including a network (e.g., a communication network) such as the Internet and a communication link (e.g., a communication line) such as a telephone line.

Further, the program may be directed to implement a part of the operation described above. The program may be a so-called differential file (differential program) configured to implement the operation by a combination of a program already recorded on the computer system.

Although some embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof.

According to one or more example embodiments of the disclosure, it is possible to provide an airbag apparatus that makes it possible to appropriately control an occupant behavior upon side contact or frontal contact of the vehicle.

The invention claimed is:

1. An airbag apparatus to be applied to a vehicle, the airbag apparatus comprising:
  a far-side airbag to be disposed on a center console side of a seat backrest of a front seat of the vehicle, the far-side airbag comprising a single cylindrical base fabric member, the far-side airbag having an annular outer periphery, the far-side airbag having, in an inner periphery:
    a shoulder protection air chamber having a back shoulder air chamber, a side shoulder air chamber, and a front shoulder air chamber that are each to be expanded into a longitudinal cylindrical shape configured to protect a shoulder of an occupant in the vehicle;

a head protection air chamber to be expanded into a semicircular shape and configured to fall against the occupant seated in the front seat of the vehicle to protect a head portion of the occupant; and a non-inflating unit disposed adjacent to the back shoulder air chamber; and an expansion control processor configured to control expansion of the far-side airbag, wherein the non-inflating unit comprises an inflator therein, the inflator being covered with a cylinder, wherein the far-side airbag has a gas passage through which high-pressure gas is discharged from:

an upper discharge port of the cylinder and is fed into the head protection air chamber; and a lower discharge port of the cylinder and is fed into the front shoulder air chamber, wherein the high-pressure gas discharged from the lower discharge port and the high-pressure gas discharged from the upper discharge port merge with each other at a first aperture provided between the head protection air chamber and the shoulder protection air chamber, thereby creating a merged high-pressure gas, wherein the merged high-pressure gas flows through the first aperture into the back shoulder air chamber to expand the back shoulder air chamber, and wherein the merged high-pressure gas subsequently flows into the side shoulder air chamber through a second aperture to expand the side shoulder air chamber.

2. The airbag apparatus according to claim 1, wherein the cylinder has a J-shape.

3. The airbag apparatus according to claim 2, wherein the far-side airbag has a hollow space defined between an inner face of the cylinder and an outer shape of the inflator, and wherein the shoulder protection air chamber changes its expanded shape to rotate forward around a side face of the non-inflating unit comprising the inflator to deform so as to wrap around the occupant after the expansion of the far-side airbag.

4. The airbag apparatus according to claim 3, wherein, when the occupant comes into contact with the back shoulder air chamber after the expansion of the far-side airbag, the hollow space defined between the inner face of the cylinder and the outer shape of the inflator equalizes the high-pressure gas.

5. The airbag apparatus according to claim 1, wherein, subsequently to the merged high-pressure gas expanding the side shoulder air chamber, the front shoulder air chamber and the head protection air chamber are further expanded thereby completing the expansion of the entire far-side airbag.

6. The airbag apparatus according to claim 1, wherein the cylinder has a J-shape extending from an upper end to a lower end of the cylinder.

7. The airbag apparatus according to claim 1, wherein the back shoulder air chamber, the side shoulder air chamber, and the front shoulder air chamber of the shoulder protection air chamber and the head protection air chamber are expanded immediately upon right-side contact, left-side contact, or frontal contact of the vehicle.

* * * * *